(No Model.)  6 Sheets—Sheet 1.
H. A. HARVEY.
SCREW SWAGING MACHINE.

No. 383,949. Patented June 5, 1888.

(No Model.) 6 Sheets—Sheet 2.

H. A. HARVEY.
SCREW SWAGING MACHINE.

No. 383,949. Patented June 5, 1888.

Witnesses:
Edw. H. Williams.
A. M. Jones.

Inventor.
H. A. Harvey,
Per Edw. E. Quimby,
Atty.

(No Model.)

6 Sheets—Sheet 3.

H. A. HARVEY.
SCREW SWAGING MACHINE.

No. 383,949.  Patented June 5, 1888.

Witnesses:
Edw. H. Williams
A. M. Jones

Inventor:
H. A. Harvey,
Per Edw. E. Quimby,
Atty.

(No Model.) 6 Sheets—Sheet 4.

H. A. HARVEY.
SCREW SWAGING MACHINE.

No. 383,949. Patented June 5, 1888.

Witnesses:
Edw. H. Williams.
A. M. Jones.

Inventor:
H. A. Harvey,
Per Edw. E. Lumby
Atty.

(No Model.) 6 Sheets—Sheet 5.

H. A. HARVEY.
SCREW SWAGING MACHINE.

No. 383,949. Patented June 5, 1888.

Witnesses:
Edw H. Williams,
A. M. Jones.

Inventor:
H. A. Harvey,
Per Edw. E. Lumly,
Atty.

(No Model.) 6 Sheets—Sheet 6.

H. A. HARVEY.
SCREW SWAGING MACHINE.

No. 383,949. Patented June 5, 1888.

Witnesses:
Edw. H. Williams,
A. M. Jones.

Inventor:
H. A. Harvey,
Per Edw. E. Lumly
Atty.

UNITED STATES PATENT OFFICE.

HAYWARD A. HARVEY, OF ORANGE, NEW JERSEY.

SCREW-SWAGING MACHINE.

SPECIFICATION forming part of Letters Patent No. 383,949, dated June 5, 1888.

Application filed January 13, 1888. Serial No. 260,028. (No model.)

*To all whom it may concern:*

Be it known that I, HAYWARD A. HARVEY, of Orange, New Jersey, have invented certain Improvements in Double Screw-Thread-Rolling Machines, of which the following is a specification.

This invention relates to screw-thread-rolling machines of the type in which the formation of the threads is effected by the action of actively-reciprocating dies which roll the screw-blanks over the faces of supporting-dies, the opposed faces of the said dies being provided with systems of parallel ribs relatively inclined in opposite directions.

The invention consists of two actively-reciprocating dies moving in rectilinear paths and operated by a common actuator, in combination with two supporting-dies which are supported in the frame of the machine and the faces of which are appropriately ribbed and are parallel with and in suitable proximity to the planes of motion of the faces of the actively-reciprocating dies, respectively. By means of independent feeding devices screw-blanks are delivered, respectively, in opposite positions to be acted upon by the two pairs of dies, so that at each complete stroke of the common actuator, threads are formed upon two blanks.

Figure 1:
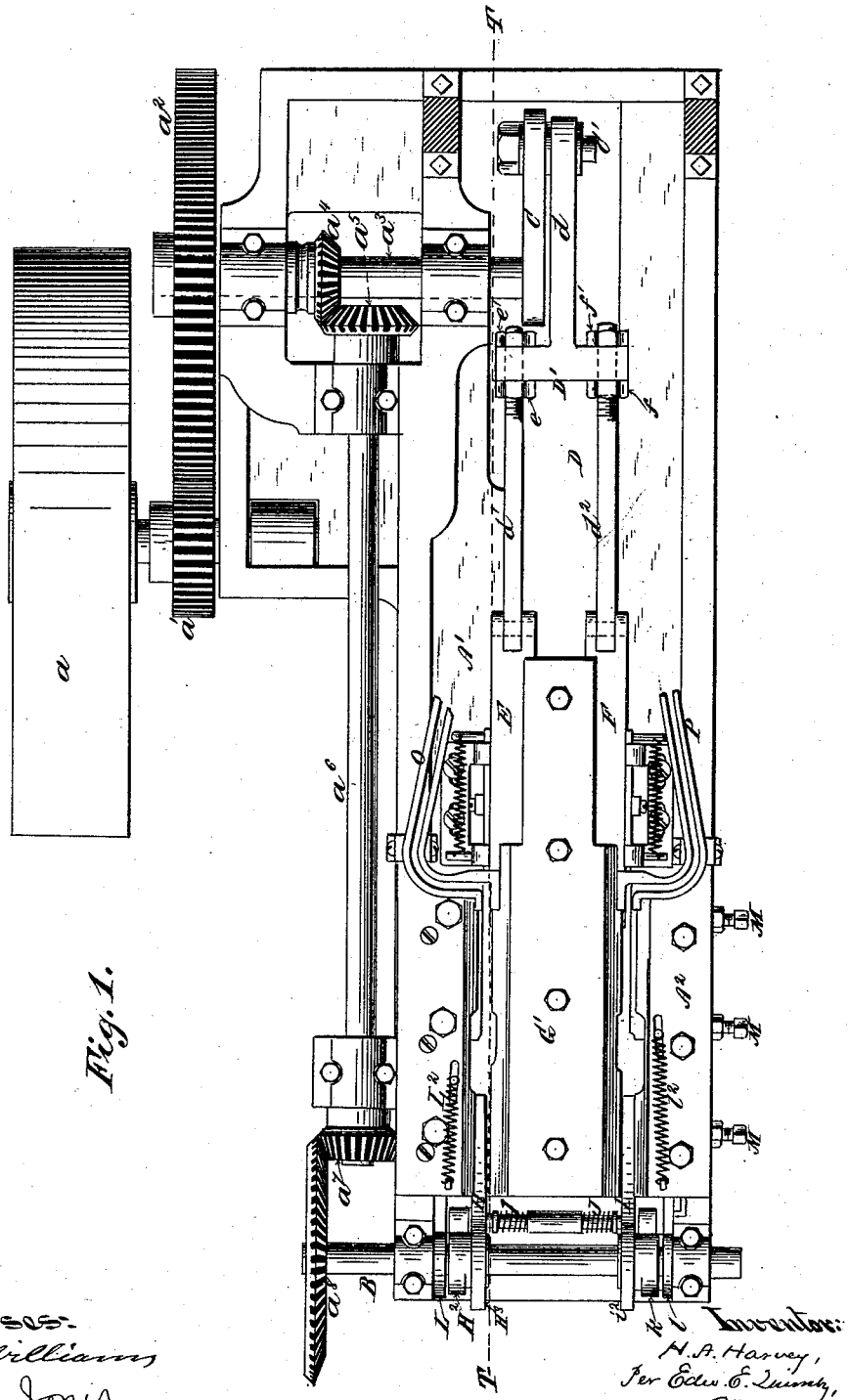
Figure 2:
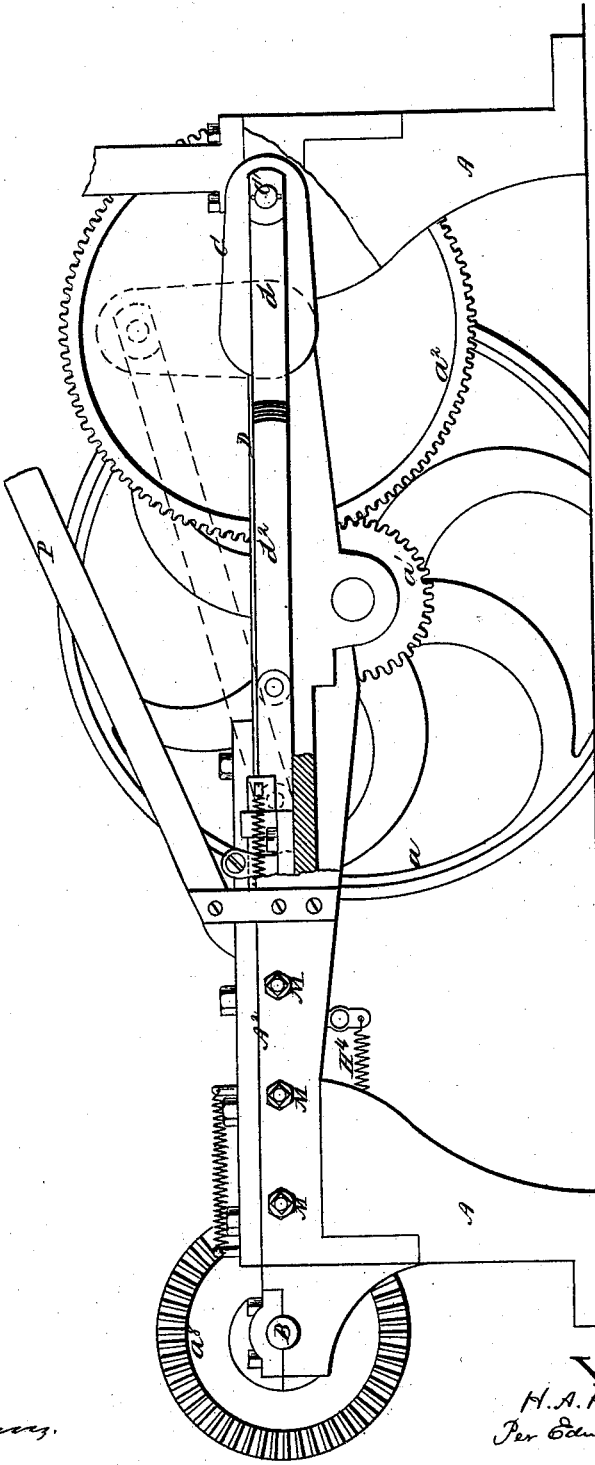
Figure 3:
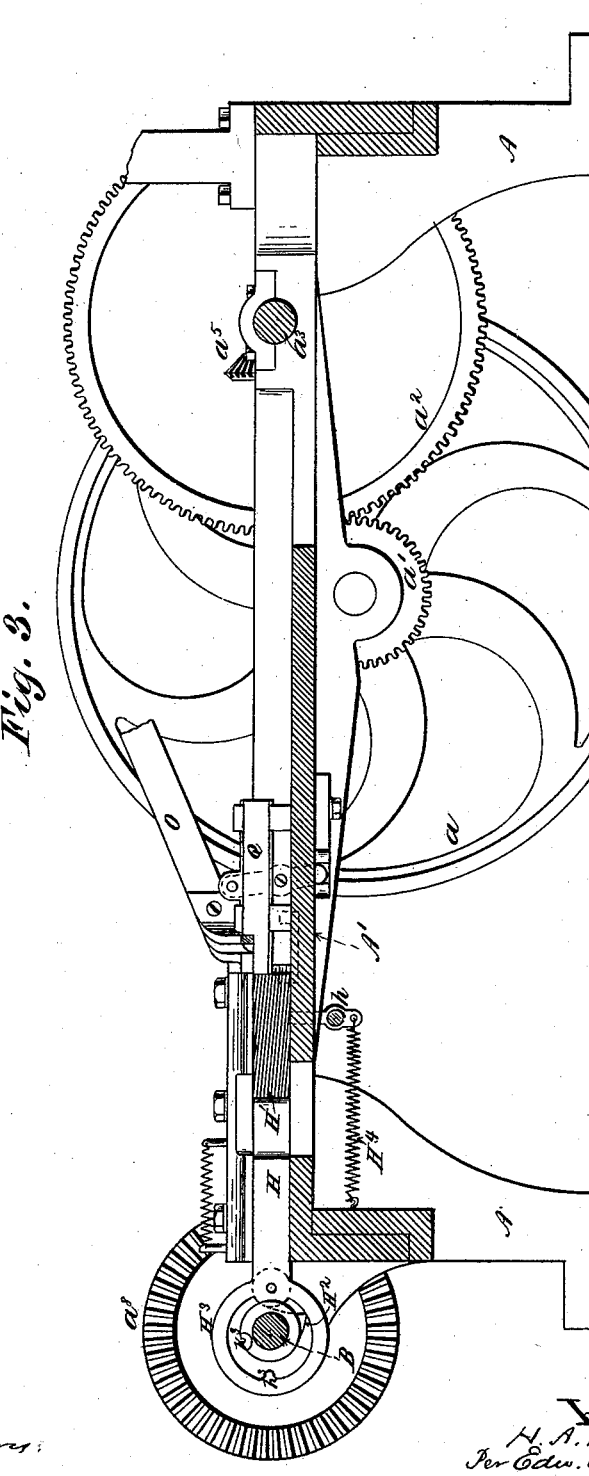
Figure 5:
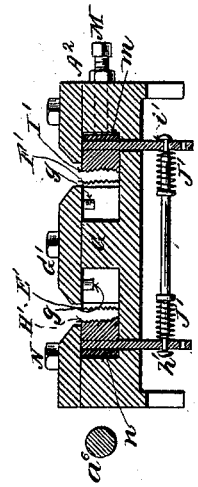
Figure 6:
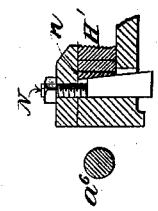
Figure 4:
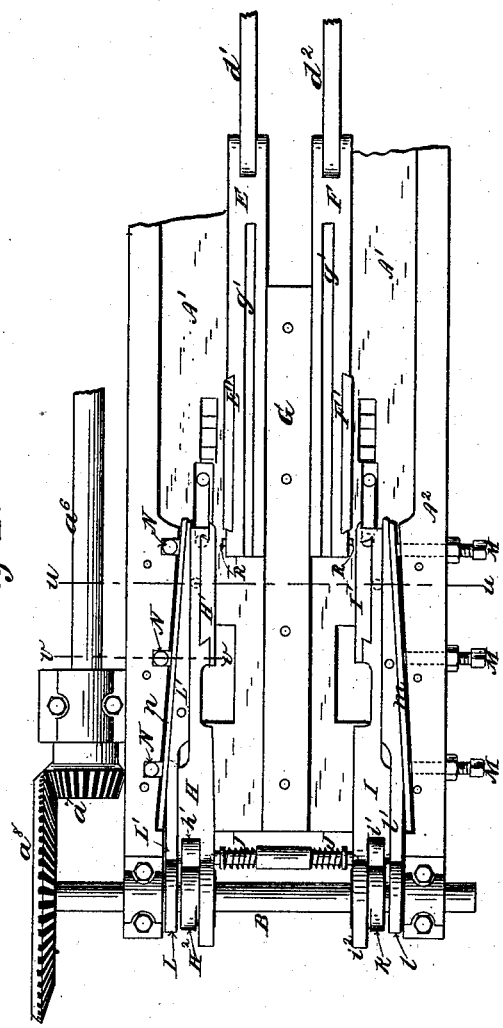
Figure 8:
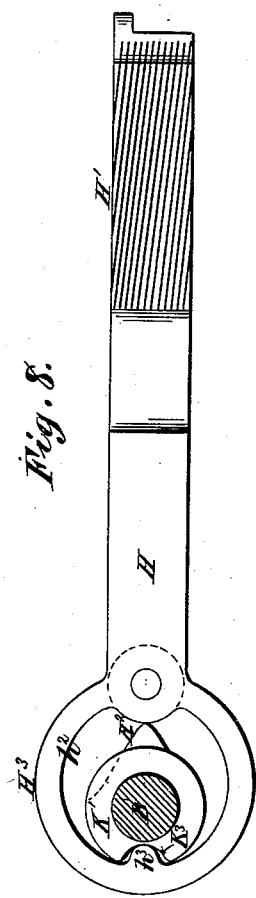
Figure 7:
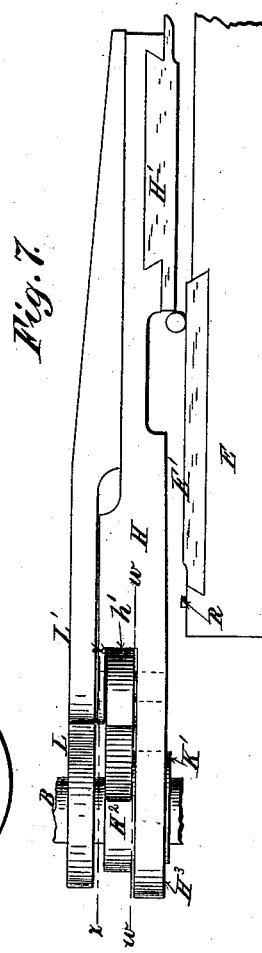
Figure 9:
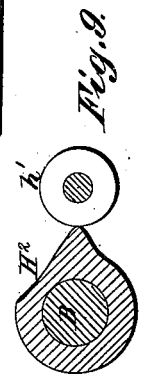
Figure 10:
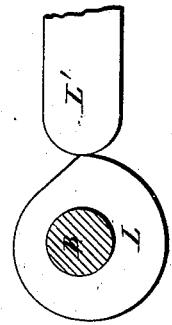
Figure 11:
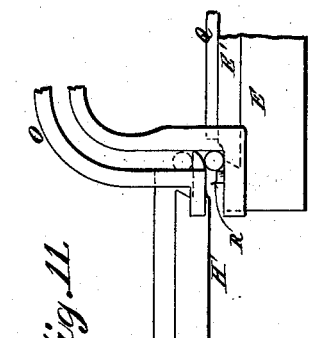
Figure 12:
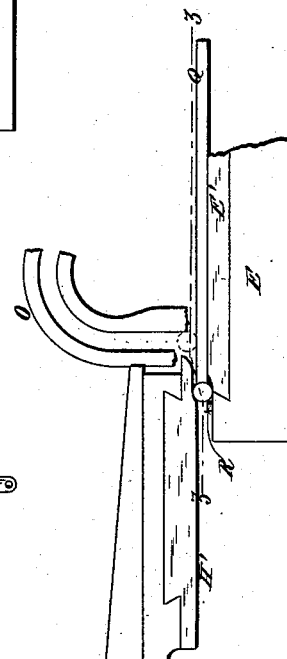
Figure 13:
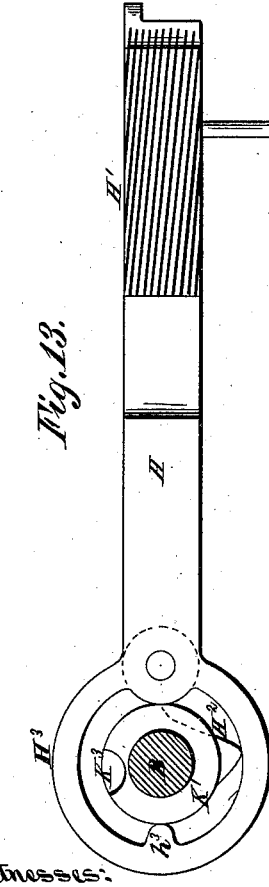
Figure 16:
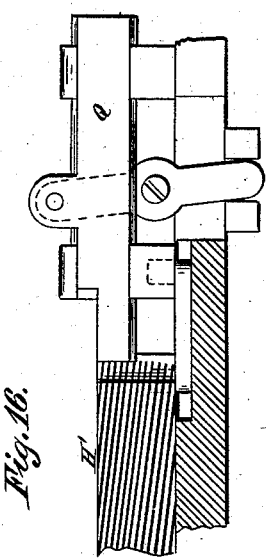
Figures 14, 15:
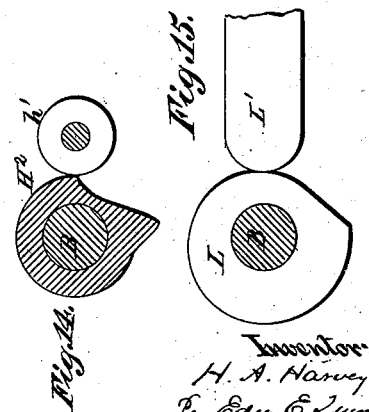

The accompanying drawings, illustrating a machine containing the improvements, are as follows:

Figure 1 is a top view. Fig. 2 is a side elevation partly in section. Fig. 3 is a vertical section taken through the line T T on Fig. 1. Fig. 4 is a top view of the portion of the machine in which the dies are supported, with the caps omitted for the purpose of more clearly showing the supporting-dies and the devices for supporting and operating them. Fig. 5 is a transverse vertical section on the plane indicated by the dotted line *u u* on Fig. 4. Fig. 6 is a vertical section on the plane indicated by the dotted line *v v* on Fig. 4. Fig. 7 is a top view of one of the supporting-dies and one of the cams which operate it, showing it in its extreme forward position, in which the finger upon its forward end acts as a divider for dividing the lowermost blank from the column of blanks held suspended by their heads in the ways, and also affording a top view of the adjacent actively-reciprocating die in the position which it occupies near the conclusion of that one of its excursions in which it rolls the finished blank off from the rear end of the supporting-die. Fig. 8 is an elevation of the supporting-die shown in Fig. 7, and of the carriage in which it is mounted, and of the cam for imparting endwise reciprocating movements to the said carriage. Fig. 9 is a vertical section through the line *w w* on Fig. 7. Fig. 10 is a vertical section through the line *x x* on Fig. 7, showing the cam for operating the wedge, by means of which the supporting-die is wedged toward the plane of motion of the adjacent actively-moving die. Fig. 11 is a top view of the lower end of one of the ways, showing the separator-finger on the end of one of the supporting-dies in the position which it assumes in relation to the ways when the cams which control the movements of the said supporting-die are in the positions in which they are represented, respectively, in Figs. 7, 8, 9, and 10; also showing the end of the actively-moving die in the position which it occupies immediately preceding the commencement of that one of its excursions in which the blank at the end of the ways is moved against the face of the supporting-die. Fig. 12 is a top view of one of the supporting-dies and the cams which operate it and of a portion of the adjacent actively-moving die, which is represented as having just entered upon that one of its excursions during which the blank at the end of the ways is carried by the deliverer into the position in which it is about to be caught between the opposed faces of the two dies. Fig. 13 is a side elevation of the supporting-die and its carriage, showing the position of the cam which operates it at the time when the parts are in the positions in which they are shown in Fig. 12. Fig. 14 is a vertical section of the carriage-operating cam, taken through the line *y y* on Fig. 12. Fig. 15 is an elevation of one of the wedge-operating cams. In Figs. 14 and 15 the two cams mentioned are respectively shown in the positions which they occupy when the other parts are in the positions in which they are represented in Fig. 12. Fig. 16 is a vertical section through the line *z z* on Fig. 12, showing in elevation the deliverer and the mechanism for operating it in the positions they occupy when the deliverer is in the position in which it is represented in Fig. 12.

The frame of the machine consists of uprights A A, supporting a horizontal table, A'.

Power to drive the machine is applied to the pulley $a$, to the shaft of which is affixed the pinion $a'$, engaging the gear $a^2$, affixed to the crank-shaft $a^3$. By means of the miter-wheels $a^4$ and $a^5$ power is transmitted to the shaft $a^6$, from which in turn, by means of the bevel-wheels $a^7$ and $a^8$, power is transmitted to the cam shaft B. The crank-arm C, affixed to the crank-shaft $a^3$, is pivotally connected by the crank-pin C' to the stem $d$ of the bifurcated pitman D. The two branches $d'$ and $d^2$ of the bifurcated pitman D are preferably inserted through perforations in the cross-head D', and the portions of them which are inserted through the cross-head are each preferably screw-threaded and provided with nuts $e\ e'$ and $f f'$, respectively. At their opposite ends the branches $d'$ and $d^2$ are pivoted, respectively, to the actively-reciprocating die-carriages E and F, which are seated upon the table A', and are separated from each other by the vertical rib G, and are held in their appropriate positions by means of the cap G', provided upon its under side with the downwardly-projecting pins $g\ g$, which enter the longitudinal grooves $g'\ g'$, formed in the tops of the die-carriages E and F, respectively.

It will be seen that by means of the nuts $e\ e'$ and $f f'$ the actively-reciprocating die-carriages E and F can be independently adjusted endwise with relation to the crank-shaft.

The actively-reciprocating die E' is mounted upon the carriage E and operates in conjunction with the supporting-die H', and the actively-reciprocating die F' is mounted upon the carriage F and operates in conjunction with the supporting-die I', mounted upon the carriage I.

The die-carriages H and I are pressed laterally away from each other by means of the expanding spiral springs J J, (shown in Figs. 1 and 4,) and also by means of the expanding spiral springs J' J', (shown in Fig. 5,) which latter, as will be seen, exert their outward thrusts upon pins $h$ and $i$, which are respectively inserted into and project downward from the supporting-die carriages H and I.

Appropriate to and fro endwise movements are imparted to the carriage H for the purpose of effecting the successive feeding of the blanks and the successive discharge of the finished screws by means of the cam $H^2$, the periphery of which bears upon the anti-friction roller $h'$, pivoted to the carriage H. The rear end of the carriage H terminates in the yoke $H^3$, which loosely incloses the hub K' of the cam $H^2$. The hub K' is provided with a notch, $K^3$, for engaging at the proper time the rib $h^3$, projecting radially inward from the inner side, $h^2$, of the yoke $H^3$, the object of such engagement being to steady the movement of the carriage H when the parts are in the position in which they are represented in Fig. 8, in which, as will be seen, the apex of the cam $H^2$ is bearing upon the anti-friction roller $h'$. Similarly the carriage I is provided with an anti-friction roller, $i'$, affording a bearing for the cam $k$, the hub of which is loosely inclosed in the yoke $i^2$, and is provided with a notch similar to the notch $K^3$ for engaging a rib upon the inner side of the yoke $i^2$, which rib is similar to the rib $h^3$. (Shown in Fig. 8.)

The machine is preferably so organized that the actively-reciprocating dies make several to and fro movements, and hence roll the screw-blanks successively several times to and fro over the surfaces of the supporting-dies, in order to fully form the threads upon them. During the greater part of this operation the faces of the supporting-dies are made to gradually approach the planes of motion of the faces of the actively-reciprocating dies. This is effected by means of the cams L $l$, acting, respectively, upon the wedges L' $l'$. These wedges are moved endwise in one direction by their cams, and in the opposite direction when their cams permit it by their reciprocating springs $L^2\ l^2$, respectively.

Provision is made for laterally adjusting the supporting-die I' by means of the horizontal set-screws M M M, inserted through the standard $A^2$ and bearing upon their inner ends upon the gib $m$, which affords the support for the diagonal side of the wedge $l'$. Upon releasing the set screws M M M the carriage I, wedge $l'$, and gib $m$ are permitted to move outwardly under the influence of the expanding-springs J' and J'. As, owing to the presence of the counter-shaft $a^6$ and the bevel-gears $a^7$ and $a^8$, it is inconvenient to employ horizontal set-screws to effect the lateral adjustment of the carriage H of the die H', the expedient is adopted which is illustrated in Fig. 6, in which, as will be seen, the gib $n$, which affords support for the diagonal side of the wedge L' is tapering in cross-section, and so placed that its inclined side bears upon the inclined side of the wedge bolts N N. By raising the wedge bolts N N the gib $n$, wedge L', carriage H, and die H' are forced toward the center of the machine, while when the wedge-bolts N N are dropped down, the said parts are free to move laterally outward in obedience to the thrust of the springs J J and J' J'.

The die-carriages H and I are each provided with a retracting-spring, one of which, $H^4$, is shown in Fig. 3, and, as will be seen, is attached at one end to the standard of the machine, and at the opposite end to the pin projecting downward from the carriage H. The machine is provided with two pairs of ways—one pair, O, for feeding screw-blanks to the dies E' and H', and the other, P, for feeding blanks to the dies F' and I'.

The mode of operating the deliverers Q Q, for delivering the blanks successively from the ends of the ways into positions to be seized by the dies, respectively, is substantially the same as that illustrated in Letters Patent of the United States No. 357,002, granted to H. A. Harvey for improvement in machine for rolling screws, dated February 1, 1887, excepting, however, that in the present case the whole operation of separating the lowermost blank and of delivering it to the dies, is performed with great rapidity; and to prevent the blank which is being fed from being thrown by the deliverer too far beyond the end of the actively-reciprocating die the face of the carriage upon which the actively-reciprocating die is mounted is provided with a laterally-projecting shoulder or laterally-projecting pins, either of which expedients serves as a stop against which the body of the blank bears when the parts are in the positions in which they are represented in Figs. 11 and 12.

In the drawings, the stop R is represented as applied to the carriage E of the actively-reciprocating die E'.

It will be understood, of course, that a similar stop is applied to the carriage F of the actively-reciprocating die F'. One of the important and novel features of the present machine consists in the employment of cams for controlling the endwise movement of the supporting-dies, which are independent of the cams, for controlling the lateral movements of those dies. It hence follows that a large range of endwise movement is permitted to the supporting-dies without any of the increased friction which would be due to the accompanying lateral movement of those dies if such movement occurred coincidently with and in proportion to the endwise movement, as in the case of the machine shown in the Letters Patent of the United States No. 357,002, hereinbefore referred to.

Another peculiar feature of the present machine, by which a product of very great smoothness is obtained, consists in arresting the lateral movement of the supporting-die for a sensible period prior to the discharge from the dies of the finished screw. This is conveniently accomplished by making a suitable portion of the cams L and l concentric, the concentric portion of the cam being that which is of largest radius, as shown in Figs. 10 and 15. It thus follows that the endwise movement of the wedge ceases as soon as its operating-cam has completed a prescribed portion of its revolution, and hence during the remainder of the revolution of the operating-cam the supporting-die ceases to move, or only moves very slowly toward the plane of motion of the actively-reciprocating die.

What is claimed as the invention is—

1. In an organized machine for rolling the threads of screws, two screw-blank feeding ways and deliverers, and two pairs of appropriately-ribbed dies, each pair consisting of an actively-reciprocating die and a supporting-die, in combination with a common actuating mechanism, such as a crank and pitman, for imparting motion to the said actively-reciprocating dies.

2. In a screw-thread-rolling machine of the type in which an actively-reciprocating die is employed to roll the screw-blank over the face of a supporting-die, and in which the said supporting-die has prescribed endwise movements for effecting the feeding of the blanks to the dies and the discharge of the finished screws therefrom, and during the operation of rolling the thread upon each blank also has a lateral movement toward the plane of movement of the actively-reciprocating die, the combination, as herein set forth, of a cam for instituting said endwise movements of said supporting-die, and an independent cam for instituting said lateral movement of said supporting-die.

3. The combination, in a double screw-thread-rolling machine, of two actively-reciprocating dies which are independently adjustable with relation to the mechanism which actuates them, two supporting-dies supported in the frame of the machine, and two cams for imparting prescribed endwise motions to said supporting-dies, as and for the purpose set forth.

4. In a screw-thread-rolling machine of the type herein shown, in which an actively-reciprocating die and a supporting-die are employed, a cam for imparting a prescribed range of endwise movement to said supporting-die, a wedge interposed between the carriage, upon which said supporting-die is mounted, a laterally-adjustable gib affording the bearing for the diagonal side of said wedge, and a cam for imparting a prescribed endwise movement to said wedge.

5. In a screw-thread-rolling machine of the type in which an actively-reciprocating die and a supporting-die are employed, a supporting-die, such as the die H', mounted upon a carriage, such as the carriage H, having affixed to its rear end a yoke, such as the yoke H³, provided with a rib, such as the rib h³, in combination with a cam, such as the cam H², for imparting a prescribed range of endwise movement to the carriage H, and a notched hub, such as the hub K', provided with the notch K³, for steadying the carriage H at the end of the said movement, as set forth.

6. In a screw-thread-rolling machine of the type in which an actively-reciprocating die and a supporting-die are employed, the stop R, affixed to and projecting from the face of the actively-reciprocating die-carriage at an appropriate distance from the die mounted thereon, as and for the purpose described.

7. The supporting die-carriages H and I, in combination with the expanding-springs J J and J' J', for holding the die-carriages against the side bearings upon which they slide.

8. The cam-shaft B, the cams H² and k, mounted thereon, and the supporting die-carriages H and I, in combination with the ways O and P, and the spring-check slides Q Q, operated by the die-carriages H and I, respectively.

HAYWARD A. HARVEY.

Witnesses:
M. L. ADAMS,
A. M. JONES.